March 31, 1925.
G. M. LUDLOW
1,531,486
THERMOSTATIC ATTACHMENT FOR SCALES
Filed March 4, 1922
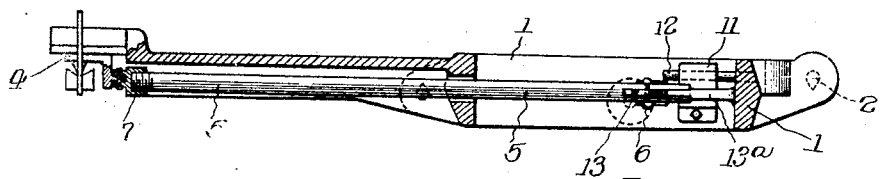
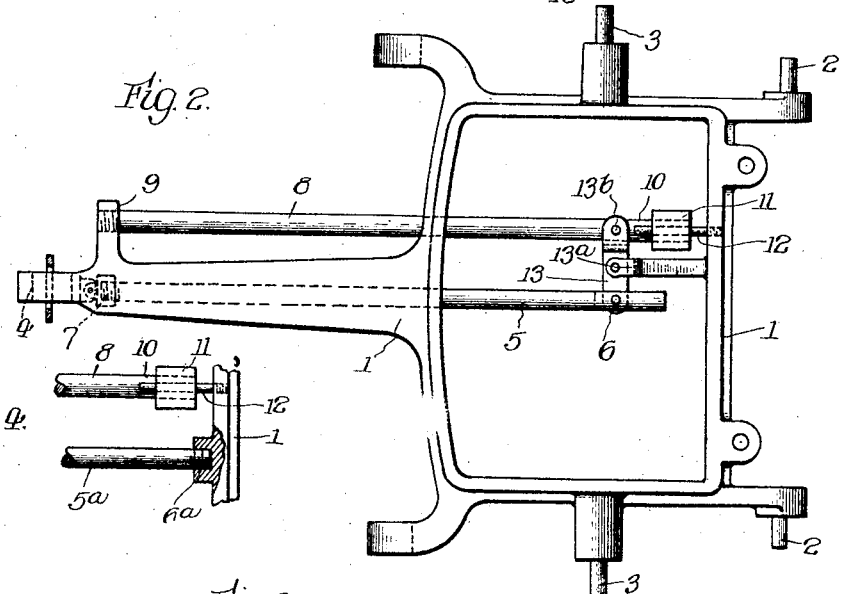
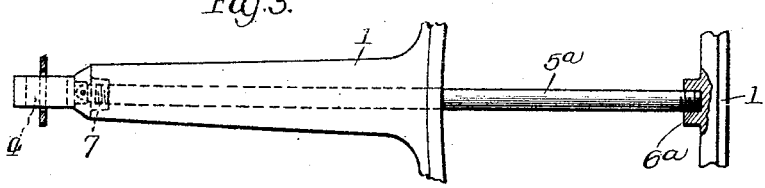
Inventor:
George M. Ludlow,
By Wilkinson Huxley Byron Knight
Attys.
Witness:
A. J. Sauser.

Patented Mar. 31, 1925.

1,531,486

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

THERMOSTATIC ATTACHMENT FOR SCALES.

Application filed March 4, 1922. Serial No. 541,014.

*To all whom it may concern:*

Be it known that I, GEORGE M. LUDLOW, a citizen of the United States, residing at Evanston, in the county of Cook and State of Illinois, have invented certain new and useful Improvements in Thermostatic Attachments for Scales, of which the following is a specification.

This invention relates to weighing scales of the type in which a lever is employed for transmitting the load to be weighed, and in which the leverage through which the load is transmitted is automatically regulated by thermostatic means to compensate for expansion and contraction of scale parts resulting from changes in atmospheric temperature.

The object of the present invention is to provide a construction of thermostatically controlled weighing lever which is very simple and cheap, positive and accurate in its action, rigid in fixation of the load transmitting point of the lever, and very low in its influence on the center of gravity of the lever. Accordingly, the underlying feature of the invention consists in constructing the weighing lever of a scale with a frame-like body and an open load transmitting arm extending therefrom, and locating within this arm, in a manner to substantially coincide with the longitudinal axis of the lever, a thermostatic element in the form of a continuous bar of thermostatic material, expanding and contracting in the direction of movement to be imparted to the load transmitting connection of the lever, preferably in the form of a movable toe-piece mounted on the end of the lever independently of the thermostatic bar, and having this thermostatic bar of sufficiently rigid nature to enable it to positively move the toe-piece in both directions of its adjustment and to positively fix its position at all times; the thermostatic rod being preferably united to the toe-piece by a rotary joint which enables the toe-piece to be squarely seated upon the transmitting end of the lever.

Another object of the invention is to provide a thermostatic lever which, in addition to the structural features named, will have a range of movement greater than that obtainable from the arrangement of the single bar described, but will still maintain the positive and accurate action as well as rigid fixation of the load transmitting point referred to. Accordingly, another feature of the invention consists in augmenting the action of the thermostatic bar, which lies in the longitudinal axis of the lever and which will be referred to as the "primary" thermostatic bar, by a secondary thermostatic bar lying in the same horizontal plane therewith, said secondary thermostatic bar being of like rigid and substantial construction whereby it is adapted to positively control the position of the transmitting toe, and the primary and secondary thermostatic bars having their inner ends connected through means of a lever of the first order, intermediately fulcrumed upon the rear end or frame member of the scale lever, while the outer end of the secondary thermostatic bar is provided with a fixed anchorage upon the outer end of the scale lever arm, so that while the entire thermostatic system of the lever is kept closely related to the horizontal plane of the longitudinal axis of the scale lever, movement thermostatically imparted to the transmitting toe is the cumulative effect of two thermostatic bars, each of which, as well as the transmitting connection between the bars, is adapted to positively control fixation of the transmitting point of the lever.

Still another object is to provide a simple and efficient counterpoise for counteracting the influence of the thermostat upon the center of gravity of the weighing lever; and, to this end, still another feature of the invention consists in arranging one of the longitudinally extending thermostatic bars parallel with the leverage controlling thermostatic bar but anchored near the opposite end of the lever from the anchorage of the leverage controlling thermostatic bar, so that it develops movements reciprocally with and oppositely to the leverage controlling thermostat, and having this additional thermostatic bar act upon a poise which is mounted to slide upon the weighing lever. In the preferred embodiment of this feature, the counterpoising thermostatic bar will have its rear free end connected by a reversing lever with the rear free end of the leverage controlling bar which extends to the load transmitting element, so that in addition to shifting the counterpoise, said counterpoise bar will add its thermostatic effect to the movement of the leverage controlling thermostatic bar.

In order that the invention may be fully understood, a scale lever equipped with thermostatic adjusting and compensating elements, embodying one form of the invention, and thermostats embodying other forms of the invention are shown in the accompanying drawings, by way of illustration.

In said drawings—

Figure 1 is a sectional view and Figure 2 a plan view of the scale lever equipped as aforesaid.

Figure 3 is a view showing a modified construction in which a single bar fixed rear anchorage is employed.

Figure 4 is a detail view showing the counterpoise arrangement of Figures 1 and 2 combined with the fixed abutment arrangement of Figure 3.

1 represents the scale lever which is usually fulcrumed through the medium of knife edges 2, receives one end of the loading platform through the medium of lugs 3, and transmits its load to be weighed through the medium of the adjustable toe piece or load-transmitting element 4.

In order to shift the element 4 longitudinally, to maintain constant weighing effect notwithstanding changes in temperature, the present invention employs a bar 5 of thermostatic material, anchored at its rear end as suggested at 6, Figure 1, or a similar bar $5^a$, anchored at $6^a$, Figure 3, and having its forward end connected to the element 4, as, for instance, through means of the threaded socket 7 which permits said element or toe-piece to be squarely seated against the inner surface of the transmitting end of the lever 1. The bar 5 is constructed of material having a very high coefficiency of expansion, such, for instance, as ebonite; and its effect is to develop a material shifting of the element 4 which determines the load transmitting point of the scale lever, and to hold it positively at the point to which it is shifted, the bar 5, or $5^a$, being of sufficient section to resist both thrust and tension imposed upon it through the transmitting point 4 by ouside forces.

In order to compensate for changes in center of gravity of the weighing lever 1, which might otherwise result from the shifting of the element 4, and changes in length of the bar 5, a secondary thermostatic bar 8 is provided with a fixed anchorage at 9 upon a forward portion of the lever 1, and has its longitudinally movable inner end 10 connected with a counterpoise 11 mounted to slide longitudinally of the scale lever upon a pin or other guide 12. Inasmuch as the secondary thermostatic bar 8 is anchored at an end opposite to the anchorage of the leverage-controlling thermostatic 5, the counterpoise 11 will move inward as the element 4 and bar 5 move outward, and vice versa. In other words, the effects produced by the expansion and contraction of the two thermostatic bars are reciprocal and compensating as to the center of gravity of the weighing lever when equipped with these members.

In order to develop larger capacity for expansion and contraction in the lever controlling thermostat, the latter may be constructed of a plurality of longitudinally disposed thermostatic members connected entrain so that their expansion and contraction are cumulative in the movement which they develop. For instance, as shown in Figure 2, the thermostat may consist of the bar 8 as well as the bar 5, the movements effected by said bars being rendered cumulative through the medium of a reversing lever 13 having a fixed fulcrum $13^a$ serving at one end as the abutment 6 for the rod 5, and connecting at its opposite end $13^b$ with the rod 8 so that longitudinal movement developed by expansion and contraction of rod 8, while still controlling the counterpoise 11 as described, will be transmitted in reverse directions as bodily movements of the rod 5 and will be added to by the inherent expansion or contraction of said rod 5.

The lever 1 is preferably made in the form shown, consisting of a frame-like body carrying its several supporting and loading fulcrums, and a forwardly extending arm. An important feature of this construction resides in the hollow or other open form of its said arm or extension, which permits the primary thermostat bar 5 to be located approximately coincident with the longitudinal axis of the lever and near to the horizontal plane of its fulcrum bearings, and a secondary thermostatic bar 8 is located in the same horizontal plane with the primary thermostatic bar, as also is the transmitting lever 13 between the bars and the counterpoise 11.

I claim:

1. In combination with a scale lever having a movable load transmitting element, a thermostat shifting said load transmitting element to change the leverage through which the scale acts, a counterpoise adapted to compensate for changes in center of gravity resulting from said leverage changes, and an independent thermostat controlling said counterpoise.

2. In combination with a scale lever having a movable load transmitting element, a thermostatic bar disposed longitudinally of the lever, with one end anchored to the lever and the other end connected with the load transmitting element, a counterpoise mounted upon the lever with movement in a direction to influence the center of gravity of the lever, and a thermostatic bar controlling said counterpoise.

3. In combination with a scale lever having a movable load transmitting element, a leverage controlling thermostatic bar extending longitudinally of said lever, having at its rear end a fixed anchorage on the lever and having its forward end connected with said element, a secondary thermostatic bar extending longitudinally of the lever having at its forward end a fixed anchorage upon the lever, and a counterpoise movable longitudinally upon the lever and connected with the rear end of said secondary thermostatic bar.

4. In a lever scale, a thermostat adapted to change the leverage through which the scale acts, a counterpoise compensating for changes in center of gravity resulting from said changes in leverage, an independent thermostat controlling said counterpoise, and a connection through which movements of said independent thermostat are added to the leverage changing movements of the thermostat first named.

5. In combination with a scale lever having upon its transmitting end a sliding toe-piece, a thermostatic bar mounted upon said scale lever in substantial coincidence with the longitudinal axis of the lever, having its outer end directly connected with said toe-piece through means of a rotary joint which permits the toe-piece to be squarely seated upon the transmitting end of the lever, means for sustaining the inner end of the thermostatic bar in a manner to cause said bar to move the toe-piece by expansion and contraction of the rod resulting from changes in temperature.

6. In combination with a scale lever, a thermostatic bar for changing the leverage thereof, disposed longitudinally of said scale lever, a second longitudinally disposed thermostatic bar, a counterpoise controlled by said second thermostatic bar, and a reversing lever connecting said thermostatic bars and adding to the leverage changing thermostatic bar the thermostatic movements developed by said second thermostatic bar.

Signed at Chicago, Illinois, this 2nd day of March, 1922.

GEORGE M. LUDLOW.